(12) United States Patent
Sano et al.

(10) Patent No.: US 12,610,020 B2
(45) Date of Patent: Apr. 21, 2026

(54) EQUITABLE PRESENCE OF COMMUNICATION SESSION ATTENDEES

(71) Applicant: MICROSOFT TECHNOLOGY LICENSING, LLC, Redmond, WA (US)

(72) Inventors: Christopher M. Sano, Seattle, WA (US); Emily Rachel Lederman, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 18/475,051

(22) Filed: Sep. 26, 2023

(65) Prior Publication Data

US 2025/0106348 A1     Mar. 27, 2025

(51) Int. Cl.
| | |
|---|---|
| *H04N 5/262* | (2006.01) |
| *G06V 40/20* | (2022.01) |
| *G10L 17/02* | (2013.01) |
| *G10L 17/06* | (2013.01) |
| *G10L 25/57* | (2013.01) |
| *H04N 5/278* | (2006.01) |

(52) U.S. Cl.
CPC .......... *H04N 5/2628* (2013.01); *G06V 40/28* (2022.01); *G10L 17/02* (2013.01); *G10L 17/06* (2013.01); *G10L 25/57* (2013.01); *H04N 5/278* (2013.01)

(58) Field of Classification Search
CPC ...... H04N 5/2628; H04N 5/278; G06V 40/28; G10L 17/02; G10L 17/06; G10L 25/57
See application file for complete search history.

(56) References Cited

U.S. PATENT DOCUMENTS

| | | | |
|---|---|---|---|
| 11,614,854 B1 | 3/2023 | Fitch et al. | |
| 12,184,709 B2 * | 12/2024 | Legatski ........... | H04M 1/72478 |
| 2021/0289072 A1 | 9/2021 | Baker et al. | |
| 2022/0394413 A1 | 12/2022 | Seipp et al. | |

(Continued)

OTHER PUBLICATIONS

Angel, et al., "Teleconference Sign Language Detection", In The Journal on Technology and Persons with Disabilities, May 2022, pp. 115-124.

(Continued)

*Primary Examiner* — Olisa Anwah

(74) *Attorney, Agent, or Firm* — Newport IP, LLC; Scott Y. Shigeta

(57) ABSTRACT

The techniques disclosed herein provide equitable presence of video conference attendees. A system gives attribution to a primary attendee in response to the detection of active speaking activities of users who are delegated as assistants for the primary attendee. Attribution can include at least one of (1) highlighting a video of the primary attendee, (2) positioning a video of the primary attendee in a primary region of a user interface, or (3) associating the primary attendee to transcript text or close captioning text that is generated from the speaking activities of the delegated assistants. By providing attribution to a primary attendee, instead of providing attribution to an assistant who is speaking on behalf of the primary attendee, a system can provide equitable meeting presence for those who are truly making substantive contributions to a video conference.

20 Claims, 11 Drawing Sheets

(56)     References Cited

U.S. PATENT DOCUMENTS

2023/0073828  A1*    3/2023    Vendrow .............. H04L 65/403

OTHER PUBLICATIONS

Moryossef, Amit, "Developing Real-Time, Automatic Sign Language Detection for Video Conferencing", Retrieved from: https://ai.googleblog.com/2020/10/developing-real-time-automatic-sign.html, Oct. 1, 2020, 06 Pages.
Sonare, et al., "Video-Based Sign Language Translation System Using Machine Learning", In Proceedings of 2nd International Conference for Emerging Technology, May 21, 2021, pp. 1-4.

* cited by examiner

500

501
USER JOINS A COMMUNICATION SESSION

503
ACCESSING SETTINGS THAT PERSIST ACROSS MULTIPLE COMMUNICATION SESSIONS

505
ANALYZE DATA STRUCTURE TO IDENTIFY A DELIGATE FOR A PRIMARY USER AND TO DETERMINE MODE OF OPERATION

507
DETECT AUDIO FROM DELIGATE

509
GRANT ATTRIBUTION FOR PRIMARY USER FOR SPEECH INPUT PROVIDED BY THE DELEGATE

700

709

COMMUNICATIONS INTERFACE(S) 706

VIDEO CAMERA AND/OR AUDIO DEVICE 722

DATA PROCESSING UNIT(S) 702    MEMORY 716

COMPUTER-READABLE MEDIA 704

DATA STORE 708

SESSION DATA 710

400

401

OPERATING SYSTEM 718

APIs 710

SERVER MODULE 730

OUTPUT MODULE 732

GUI PRESENTATION MODULE 740

EQUITABLE PRESENCE OF COMMUNICATION SESSION ATTENDEES

BACKGROUND

There are a number of collaborative systems that allow users to communicate. For example, some systems allow people to collaborate by sharing content using video streams, shared files, chat messages, etc. Some systems also allow people to simultaneously edit documents while also enabling them to communicate using video and audio streams. Users can also establish a communication session at a specific time, e.g., a time slot for an online meeting, and share live video streams that can concurrently display people and content.

Although existing collaborative systems provide features that allow people to conduct meetings via live video streams, some of these systems still have a number of drawbacks. For example, some existing systems do not have effective features that accommodate people who need language translators or sign language interpreters. In such instances, a meeting attendee can have an assistant, such as a translator or an interpreter. The assistant can observe the meeting attendee and then communicate an interpretation of their observations to the other meeting attendees. For example, deaf or hard-of-hearing (D/HH) attendees of a video conferencing meeting use sign language and require an interpreter to translate sign language into spoken language and vice versa. These users may depend on one or more interpreters for bi-directional communication and/or ancillary support.

A meeting assistant, such as a translator and/or a sign language interpreter, is often confused as a participant in meetings. This leads to awkward interactions and unnecessary bias by meeting participants. For example, when an assistant is speaking on behalf of an attendee who is deaf or hard-of-hearing, systems often give attribution to the user who is speaking. Some existing systems can provide attribution by placing the name of the assistant near the close captioning text or in a transcript that is generated from the verbal input of the assistant. Attribution can also include the generation of a graphical highlight around a video of the assistant. Existing systems do this by detecting the audio signal received from the assistant and, in response, gives attribution the user who is speaking, instead of providing attribution to the actual source of the information, the attendee who is deaf or hard-of-hearing.

The above-described issues lead to disempowerment of the D/HH participant by taking away their agency, representation and voice. This is especially problematic in situations where there is a lack of awareness and understanding of the circumstances or dynamics at hand. For example, when using some existing systems, a D/HH person leading a large meeting does not have stage presence throughout the meeting because there is no audio coming from their computer. The interpreter, however, will be front and center. This often results in meeting participants complimenting the interpreter for the presentation instead of the presenter or even reaching out to the interpreter after the meeting to ask follow-up questions. These issues become more complex when an attendee has multiple assistants.

The above-described issues are exacerbated when data generated from a video conference is used to generate tasks, create documents, or used as input to an AI model. For example, if a task list is generated from a transcript, tasks may be created for the assistant rather than the person who is the true source of information. This can create a chain of events that creates many generations of inaccurate and/or unusable data. This result can cause systems to be ineffective, cause a number of inefficiencies, or require vast amounts of computing resources to correct.

The above-described issues can cause a meeting to be awkward and confusing for many users. Users of video conferencing applications are often left to their own creative solutions when they have a need for human translators/interpreters or other support provider to facilitate conversations between two or more parties that may not speak the same language. A support provider or a meeting assistant includes any user that helps another user during a meeting. An assistant can include a translator, interpreter, assistant, note-taker, live captioner, or any other support person. A translator can include a sign language translator or a foreign language translator, such as a French translator for a user that speaks a different language than one or more of the other meeting attendees.

SUMMARY

The techniques disclosed herein provide equitable presence of video conference attendees. A system gives attribution to a primary attendee in response to the detection of active speaking activities of users who are delegated as assistants for the primary attendee. Attribution can include at least one of (1) highlighting a video of the primary attendee, (2) positioning a video of the primary attendee in a primary region of a user interface, or (3) associating the primary attendee to transcript text or close captioning text that is generated from the speaking activities of the delegated assistants. By providing attribution to a primary attendee, instead of providing attribution to an assistant who is speaking on behalf of the primary attendee, a system can provide equitable meeting presence for those who are truly making substantive contributions to a video conference.

The disclosed techniques solve the technical problem of inequitable presence of communication session attendees by providing a technical solution that can change an operating mode of a system based on a detection of a vocal input and a detection of an attendee who has designated another attendee as an assistant. In some embodiments, a system can change an operating mode, where each operating mode can grant attribution to different attendees at different times. For example, a primary attendee may be a D/HH person who has designated another attendee as an assistant. The designation can be made prior to a meeting or during a meeting. The designation can be made for particular meetings or for particular portions of specific meetings. Using metadata defining specific meetings or defining particular portions of specific meetings, a system can change the operating mode of a meeting and give attribution to specific attendees. The attribution for a particular speech input can be changed to different attendees even though the source of the speech input does not change to different attendees. This level of control allows both the primary attendee and the delegated assistant to receive attribution at times when they are substantively contributing to a meeting, but also allows the primary attendee to receive attribution at other times when the delegated assistant is speaking on behalf of the primary attendee.

In some embodiments, the designation can be based on organizational data. The organizational data can include an organizational chart, a global address list (GAL), or any type of searchable directory of users, groups, shared contacts, calendars, and resources defined for a workspace domain. The organizational data can define one or more assistants for a primary user. In addition, the organizational data can define one or more primary users for an individual assistant. In some embodiments, the organizational data may be stored in a remote resource, and a communication system may be configured to access the organizational data from that remote resource. For example, a primary user may have an assigned assistant in an org chart and Teams may automatically infer the designation from that org chart.

In some embodiments, the system can dynamically change the operating mode in response to the detection of one or more predetermined events. In such embodiments, a primary attendee can designate another attendee as an assistant. This assistant designation can be dynamically activated or deactivated based on an input from the primary attendee or the delegated assistant. For instance, the primary attendee or an assistant may provide an input during a meeting, such as a keyboard entry or a voice command. When an input is used to activate a designation for a particular assistant, attribution may be given to the primary attendee while the particular assistant provides a voice input. When an input is used to deactivate a designation for a particular assistant, attribution may be given to the particular assistant for the speech input provided by the particular assistant. This allows a person to contribute substantively to a meeting and receive attribution at certain times even though they are designated as an assistant to another attendee.

In some embodiments, the system can accommodate a scenario where an assistant is assigned to two or more presenters. The system can accommodate this scenario by selecting individual presenters who are to receive credit for a vocal input provided by an assistant. This selection can be made in response to a user input or the selection can be performed automatically. For example, an assistant representing two different meeting presenters can provide an input to select each presenter as each presenter is contributing to a meeting. In another example, a system can detect predetermined gestures performed by each presenter and give attribution to an individual presenter in response to the detection of predetermined gestures performed by the individual presenter. An example of a detected predetermined gesture can include the detection of a D/HH attendee using sign language. When the system determines that a particular attendee is using sign language, the system can give attribution to that user for a speech input that is provide by a designated assistant.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
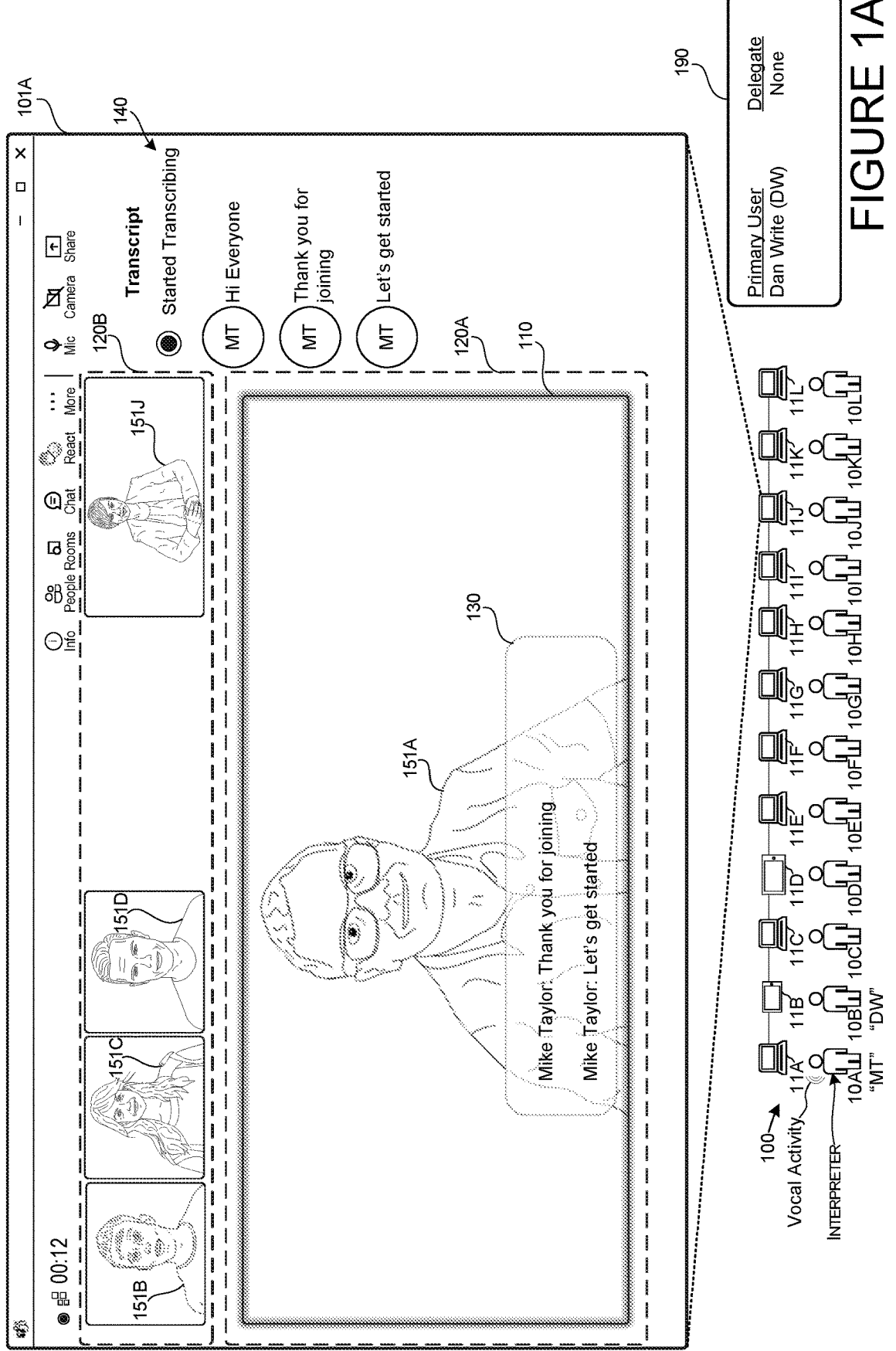
FIG. 1A illustrates a first user interface arrangement that is generated when a system is in a regular operating mode where attribution is given to an active speaker.
Figure 1B:
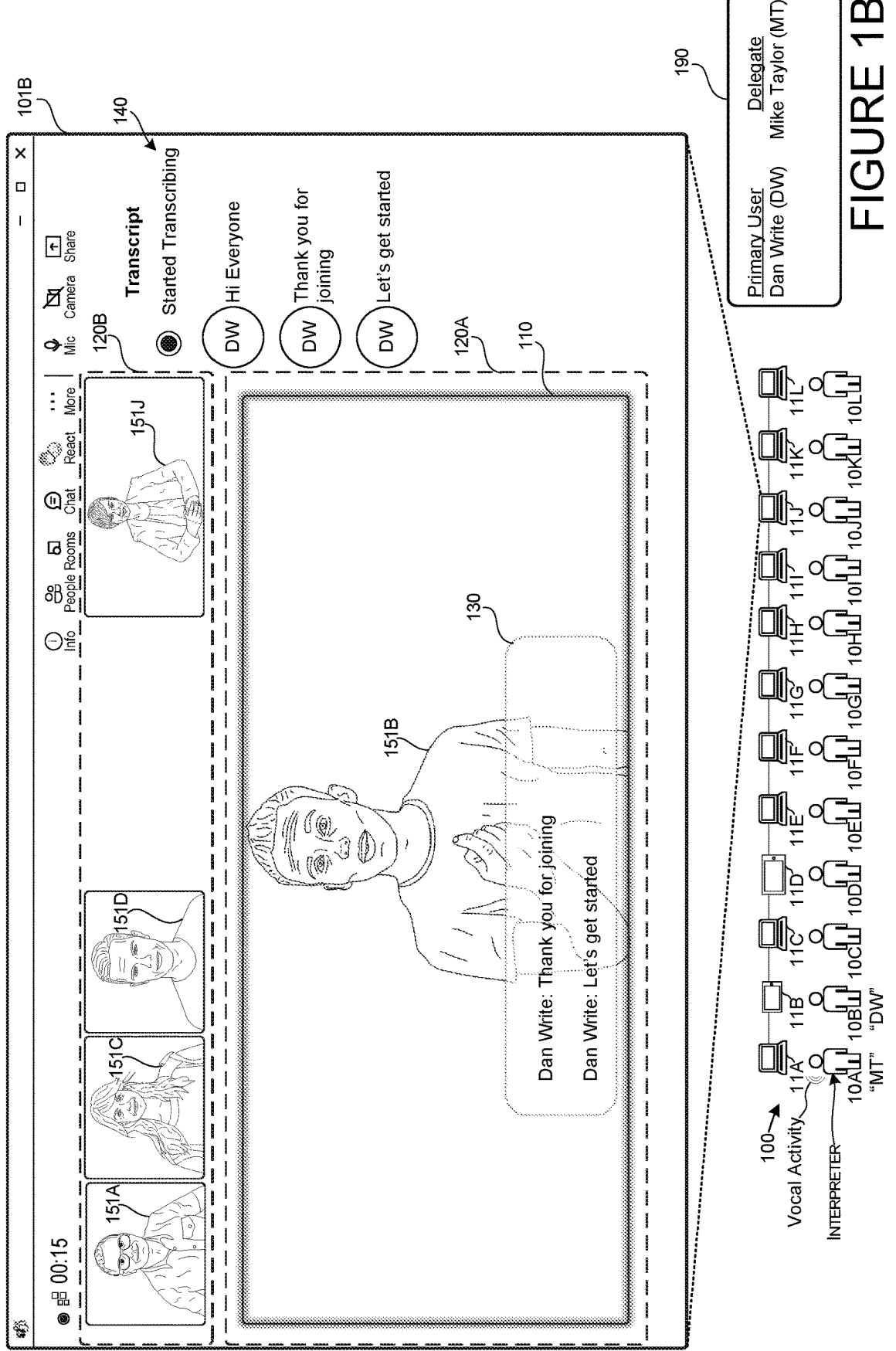
FIG. 1B illustrates a second user interface arrangement that is generated when a system is in a delegate operating mode where attribution is given to a user who has designated an active speaker as an assistant.

FIGS. 1A and 1B show an example of how a system can operate in two different operating modes to provide attribution to select users who are the true contributors of a video conference. The two different operating modes include: a regular mode for providing attribution to a user who is actively speaking, and a delegate mode for providing attribution to a presenter that has selected an assistant to speak on their behalf.

The system invokes the regular mode when the system detects a voice signal from an active speaker and the system determines that the active speaker is not assigned as a delegate for another person. While in the regular mode, attribution is given to the active speaker, e.g., the person providing the audio input that is communicated to other video conference attendees. Attribution can include at least one of (1) highlighting a video of the speaker, (2) moving a video of the speaker to a primary stage, or (3) associating the speaker to transcript text or close captioning text generated by the vocal input of the speaker.

The system invokes the delegate mode when the system detects a voice signal from an active speaker and the system determines that the active speaker is assigned as a delegate to a primary attendee, e.g., a person giving a presentation. While in the delegate mode, attribution is given to the primary attendee and not the active speaker. Attribution can include at least one of (1) highlighting a video of the primary user, (2) moving the primary user to a primary stage, or (3) associating the primary user to transcript text or close captioning text, where the text is generated by the vocal input of the speaker.

The modes of operation can occur during a communication session. A communication session can be in the form of an on-line meeting, a broadcast or any other gathering that includes a start time and an end time. As shown in FIG. 1A, the communication session can be managed by a system 100 comprising a number of computers 11 each corresponding to individual users 10. For illustrative purposes, a first user 10A, Mike Taylor, is associated with a first computer 11A, a second user 10B, Dan Write, is associated with a second computer 11B, a third user 10C, Theo Johnson, is associated with a third computer 11C, a fourth user 10D, MJ Price, is associated with a fourth computer 11D, a fifth user 10E, Kat Martin, is associated with a fifth computer 11E, a sixth user 10F, Miguel Jones, is associated with a sixth computer 11F, a seventh user 10G, Krystal Mckinney, is associated with a seventh computer 11G, an eighth user 10H, Jessica Kline, is associated with an eighth computer 11H, a ninth user 10I, Monica Larsson, is associated with a nineth computer 11I, a Tenth User 10J, Charlotte Davis, is associated with a tenth computer 11J, an eleventh user 10K, Annika Andersson, is associated with an eleventh computer 11K, and a twelfth user 10L, Isla Scoggins, is associated with a twelfth computer 11L. These users can also be respectively referred to as "User A," User B," etc.

Each user can be displayed in a user interface as two-dimensional 2D images or each user can be displayed in a user interface as a three-dimensional representation, e.g., an avatar. The 3D representation may be a static model or a dynamic model that is animated in real-time responsive to a user input. Although this example illustrates a user interface with users displayed as 2D images, it can be appreciated that the techniques disclosed herein can apply to other forms of representations, videos or other types of renderings. The computers 11 can be in the form of desktop computers, head-mounted display units, tablets, mobile phones, etc. The system can generate a user interface showing aspects of the communication session to each of the users. In the example of FIG. 1A, a first user interface arrangement 101A can include a number of renderings of one or more users 10. The renderings can include renderings of two-dimensional (2D) images, which can include a picture or live video feed of a user.

In this example, the user interface is rendered on a display device of the tenth computer 11J, which is associated with the Tenth User 10J, Charlotte Davis. Charlotte is referred to herein as the "viewer" of the user interface displayed on the tenth computer 11J. The first user interface arrangement 101A comprises a first region 120A, also referred to herein as a designated region 120A or a primary stage 120A. The first user interface arrangement 101A also includes a second region 120B, also referred to herein as a secondary region 120B or a secondary stage 120B. The first user interface arrangement 101A also comprises another rendering of a video stream 151J showing a self-view of the Tenth User 10J. This video stream 151J can be displayed in the second region 120B and is restricted from being displayed in the first region 120A. The first region is only reserved for video streams of users having roles that correspond to prerequisites of the viewer. The first user interface arrangement 101A can also include close captioning text 130 and a transcript 140 that both include text generated by a vocal activity of a user, who in this case is the first user 10A.

The example of FIGS. 1A and 1B show a method for managing display of videos of attendees in a video conference session. This method shows that a system can use metadata to select one of two modes: a first operating mode for providing attribution to a first user speaker 10A and a second operating mode for providing attribution to a primary user 10B associated with the first user speaker 10A. The metadata 190 of a communication session can define an association between the primary user 10B and another user, who is tethered to the primary user 10B as an assistant. For illustrative purposes, the primary user 10B can be a D/HH presenter who is using sign language to communicate their presentation materials. As shown, the metadata 190 can tether the first user speaker 10A to the primary user, where the first user speaker 10A is designated as an interpreter for the primary user.

To facilitate this functionality, the first user speaker 10A may be operating a computer that is displaying a rendering of the primary user, and the first user speaker 10A is providing a vocal input as they are observing the gestures of the primary user. The vocal input provided by the first user speaker 10A is delivered to devices of other attendees in the video conference session, e.g., User C, User D, etc.

In some scenarios, the system may give attribution to the speaker. This may occur when the speaker is not designated as an assistant to another user, or when the speaker is designated as an assistant to another user but that designation is temporarily deactivated. In such scenarios, in response to detecting the vocal input from the first user speaker 10A, the system accesses the metadata 190 associated with the first user speaker 10A to determine an operating mode of the system 100, wherein the metadata, e.g., a data structure, specifies a delegation designation of the first user speaker.

In this particular example, the metadata indicates that there are no delegations for the primary attendee, Dan. As shown in FIG. 1A, in response to determining that the metadata does not include a designation identifying the first user speaker being a delegate for another user, e.g., Dan, the system invokes the first operating mode and provides attribution to the first user speaker 10A for the vocal input received from the first user speaker 10A in video streams of the video conference session delivered to the devices. Although attribution can be in other formats, in this example, attribution includes as least one of highlighting 110 a video rendering 151A of the first user speaker 10A, moving or positioning the video rendering 151A of the first user 10A to a predetermined region e.g., main stage 120A of the user interface arrangement 101A, or associating an identity of the first user speaker 10A with close captioning text 130 or transcript text 140 generated from the vocal input from the first user speaker 10A.

As shown in FIG. 1B, in response to determining that the metadata includes a designation identifying the first user speaker being a delegate for a second user 10B, the system invokes the second operating mode that provides attribution to the second user 10B for the vocal input received from the first user speaker 10A. In this example, attribution includes as least one of highlighting 110 a video rendering 151B of the second user 10B while the first user speaker 10A is providing the vocal input that is communicated to the attendees of the communication session, moving or positioning the video rendering 151B of the second user 10B to a predetermined region e.g., main stage 120A of the user interface arrangement 101B while the first user speaker 10A is providing the vocal input that is communicated to the attendees of the communication session, or associating an identity of the second user 10B to transcript text 140 or close captioning text 130 generated from the vocal input from the first user speaker 10A.

Figure 2:
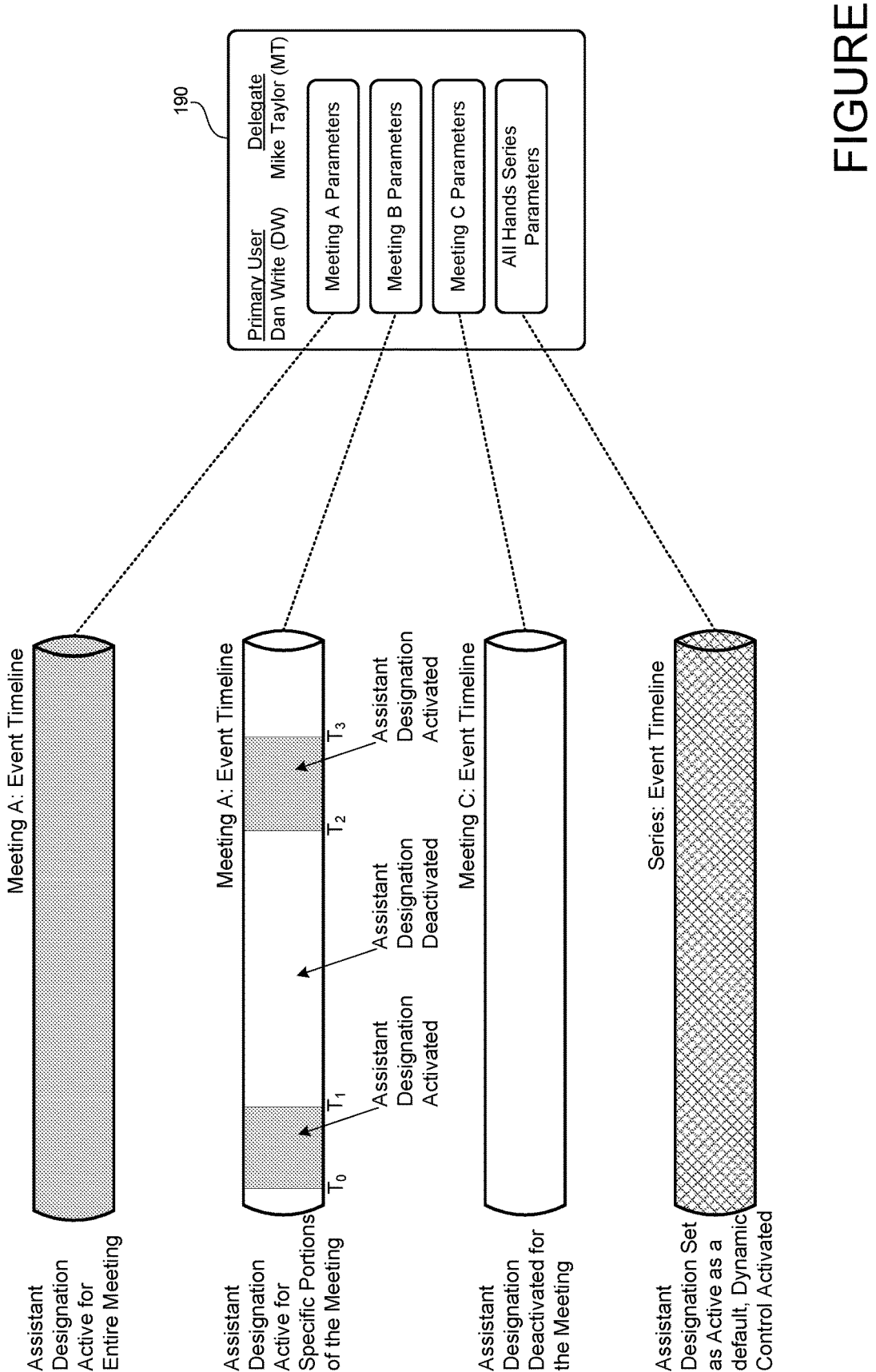
FIG. 2 is a block diagram showing an example of a data structure defining meeting parameters for activating and deactivating a delegate operating mode.

Referring now to FIG. 2, an example of a data structure defining meeting parameters for activating and deactivating a delegate operating mode is shown and described. In this example, a primary attendee, who may be a D/HH person or a person who needs a translator, can configure the metadata 190 with meeting parameters to designate another attendee as an assistant. The designation can be made prior to a meeting or during a meeting. The designation can be made for particular meetings or for particular portions of specific meetings. The system can then change the operating mode of a meeting and give attribution to specific attendees using this metadata.

In this example, the metadata indicates that, in a first meeting, the assistant designation is active for the entire meeting. This enables the system to automatically default to this mode when the meeting starts, without additional input from either the first user or the second user. In a second meeting, the assistant designation is active for certain portions of the meeting, e.g., between $T_0$ and $T_1$ and between $T_2$ and $T_3$. Also in this second meeting, the assistant designation is deactivated for other portions of the meeting, e.g., between $T_1$ and $T_2$ and after $T_3$. This customization may be useful in a situation where there is an agenda for a meeting and the user who is designated as an assistant is also assigned to other contributing roles, e.g., a presenter, Q&A participant, etc.

In a third meeting, the assistant designation is deactivated for the entire meeting. This enables the system to automatically default to this mode when the meeting starts, without additional input from either the first user or the second user. This allows the primary user to maintain a designation with another user, e.g., they can be tethered for other purposes, but for this particular meeting, the designated assistant may have another role, e.g., a presenter.

The fourth meeting is a re-occurring meeting that defines the first user as an assistant to the second user, and the assistant designation is set as active as a default setting. However, in this meeting, the assistant designation can be dynamically changed based on an input from either user. For instance, the second user can provide an input to temporarily deactivate the assistant designation and cause the system to change from the delegate mode to the regular mode and vice versa. A system can change operating modes based on any type of suitable input from any user, such as the primary attendee, a designated assistant, a moderator, etc. The input can be a manual input to an input device, such as a keyboard or touchscreen, or the input can be a voice command interpreted from speech audio.

In some embodiments, the designation can be based on organizational data. The organizational data can include an organizational chart, a global address list (GAL), or any type of searchable directory of users, groups, shared contacts, calendars, and resources defined for a workspace domain. The organizational data can define one or more assistants for a primary user. In addition, the organizational data can define one or more primary users for an individual assistant. In some embodiments, the organizational data may be stored in a remote resource, and a communication system may be configured to access the organizational data from that remote resource. For example, a primary user may have an assigned assistant in an org chart and Teams may automatically infer the designation from that org chart.

Figure 3A:
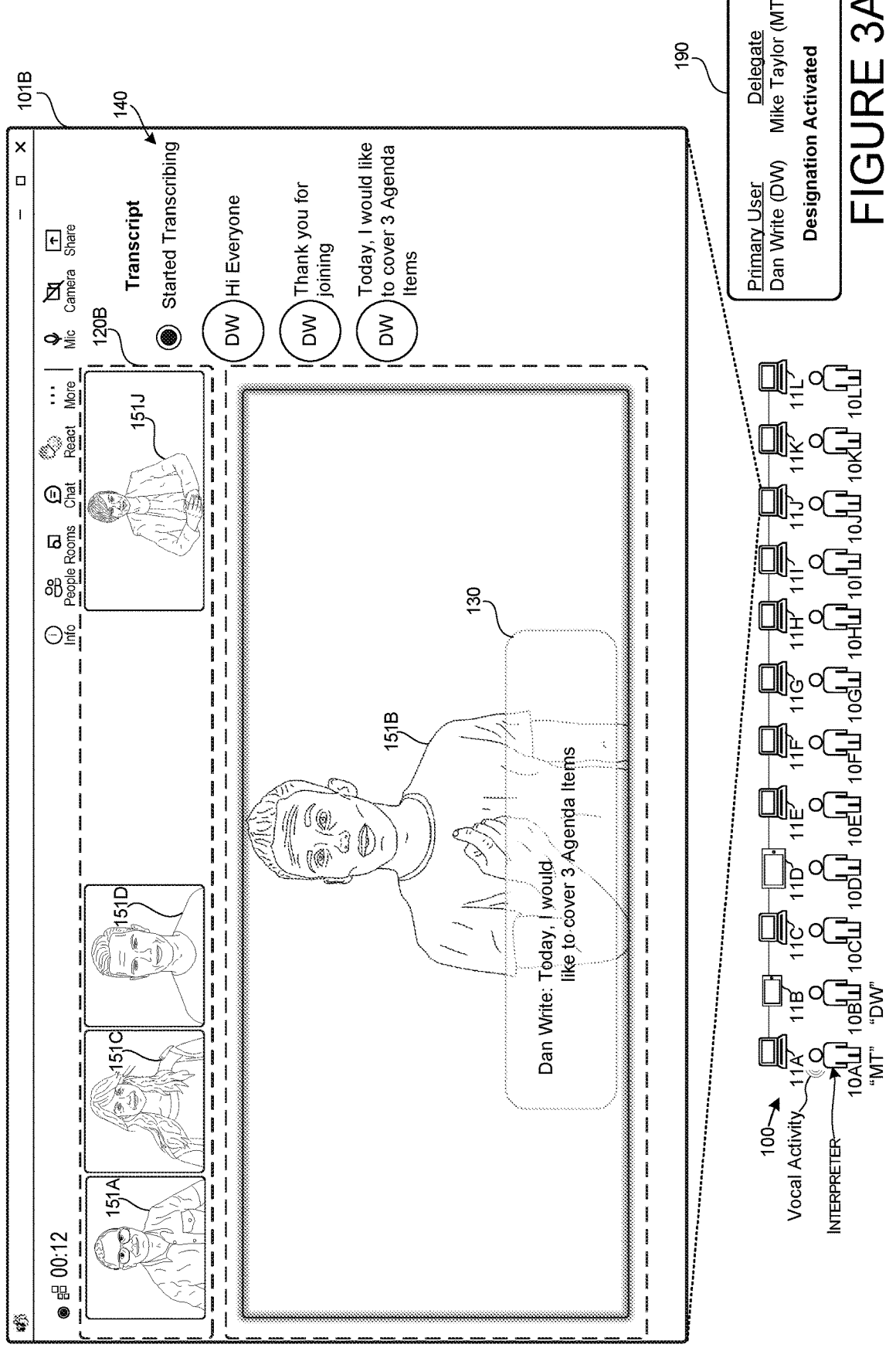
FIG. 3A illustrates a first phase of a process where a computer displays a first user interface arrangement that is generated when a system is in a delegate operating mode where attribution is given to a user who has designated an active speaker as an assistant.
Figure 3B:
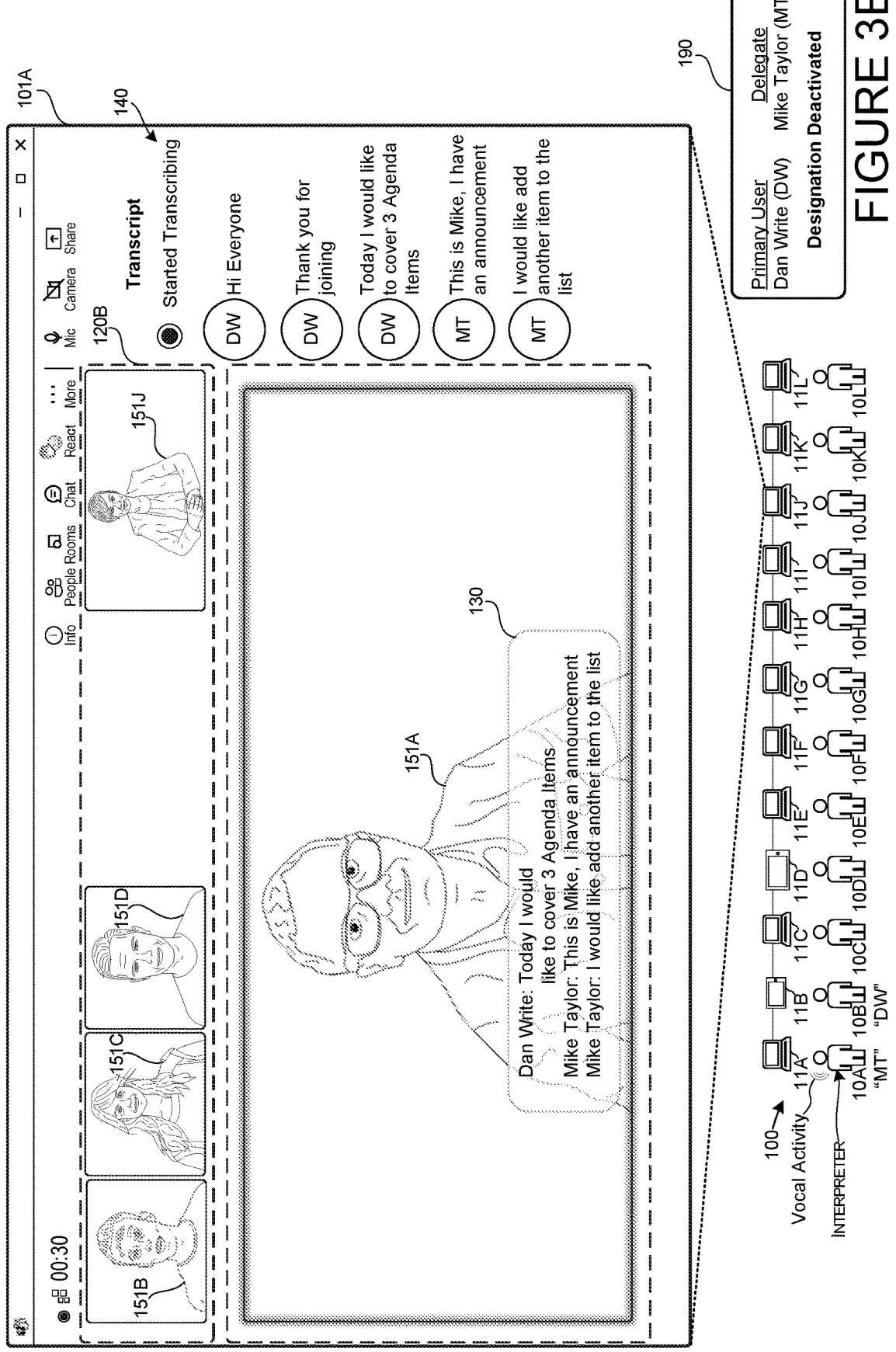
FIG. 3B illustrates a second phase of a process where a computer displays a second user interface arrangement that is generated when a system is in a regular operating mode that temporarily deactivates the delegation, where attribution is given to an active speaker even though the active speaker is assigned as a delegate to another user.
Figure 3C:
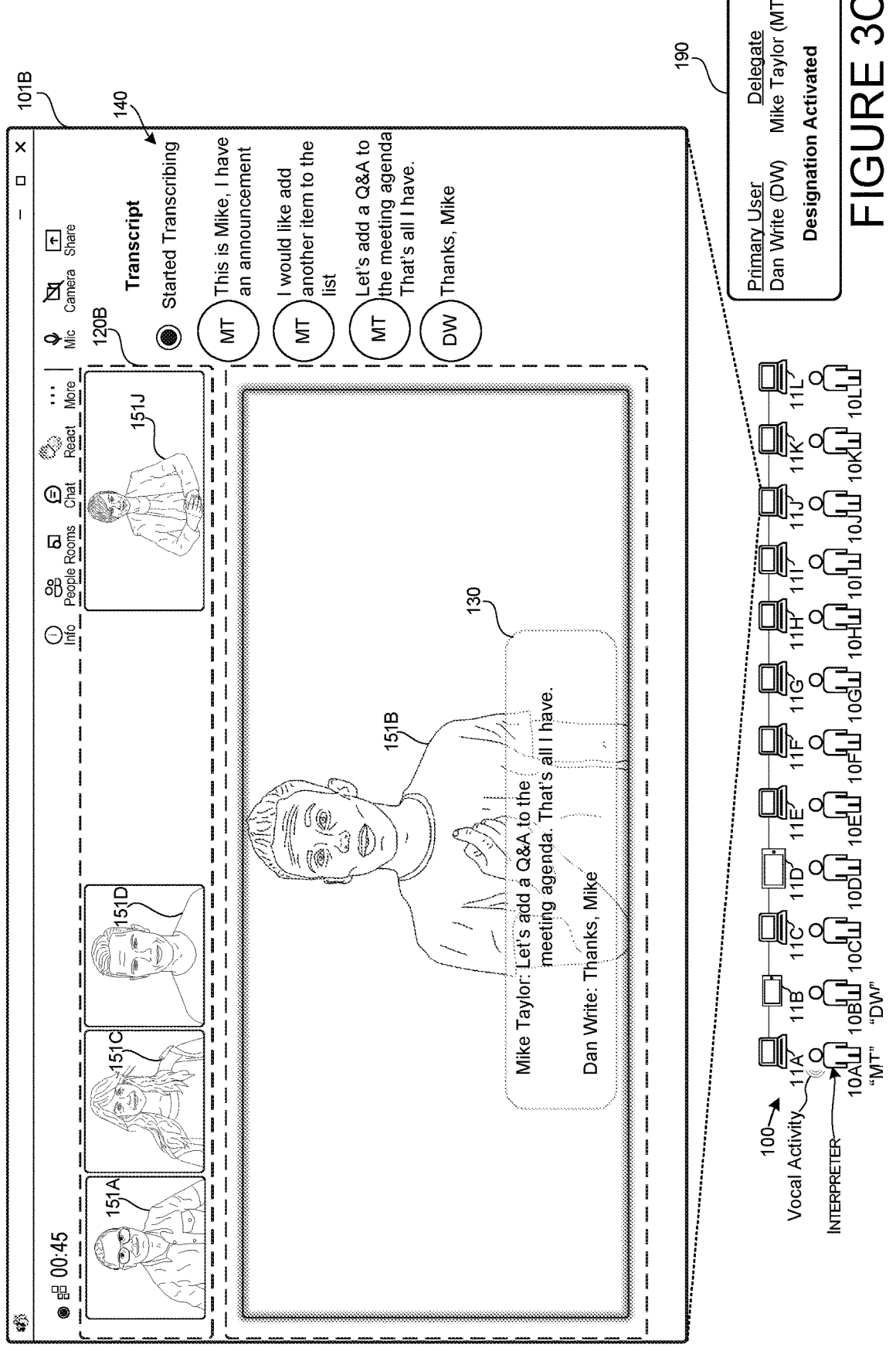
FIG. 3C illustrates a third phase of a process where a reverts back to a first user interface arrangement that is generated when a system is in a delegate operating mode where attribution is given to a user who has designated an active speaker as an assistant.

Referring now to FIGS. 3A-3C, an example scenario showing how a system can dynamically change the operating modes is shown and described. A system can dynamically change operating modes in response to the detection of one or more predetermined events. For example, a primary attendee can designate another attendee as an assistant. This assistant designation can be dynamically activated or deactivated based on an input from the primary attendee or the delegated assistant. This can include an input from a keyboard entry, touch screen, or a voice command.

When an input is used to activate a designation for an assistant of a primary attendee, and/or when the designation is activated as a default, attribution is given to the primary attendee while the assistant provides a voice input. An example of a resulting user interface is shown in FIG. 3A. As shown, attribution includes as least one of highlighting 110 a video rendering 151B of the second user 10B while the first user speaker 10A is providing the vocal input that is communicated to the attendees of the communication session, moving or positioning the video rendering 151B of the second user 10B to a predetermined region e.g., main stage 120A of the user interface arrangement 101B while the first user speaker 10A is providing the vocal input that is communicated to the attendees of the communication session, or associating an identity of the second user 10B to transcript text 140 or close captioning text 130 generated from the vocal input from the first user speaker 10A.

When an input is used to deactivate a designation for an assistant of a primary attendee, attribution may be temporarily given to the assistant even though the assistant is the active speaker providing a voice input to be communicated to other meeting attendees. For example, the system can switch to the regular mode in response to a voice input where the assistant/interpreter says "This is Mike, I have an announcement." In this statement, the person can identify themselves, e.g., provide a name, and also make a statement indicating that they need to change the operating mode and change their role to a contributing role, e.g., "I have a correction/announcement," etc.

An example of a resulting user interface from the deactivation is shown in FIG. 3B. As shown, attribution includes as least one of highlighting 110 a video rendering 151A of the first user 10A (the "active speaker"), moving or positioning the video rendering 151A of the first user 10A to a predetermined region e.g., main stage 120A of the user interface arrangement 101A, or associating an identity of the first user speaker 10A with close captioning text 130 or transcript text 140 generated from the vocal input from the first user speaker 10A. This resulting output allows a person to contribute substantively to a meeting and receive attribution at certain times even though they are designated as an assistant to another attendee.

In continuing the above-described example, a subsequent input can re-activate a designation for an assistant of a primary attendee, and attribution may be returned to the primary attendee while the assistant is providing voice input to be communicated to other meeting attendees. For example, the system can switch to the regular mode in response to a voice input where the assistant/interpreter says "That's all I have for my announcement" or "back to you, Mike." Any suitable input or voice command for identifying a time to transition the operating mode back to the delegate mode from the regular mode can be used.

An example of a resulting user interface from the re-activation is shown in FIG. 3C. As shown, attribution includes as least one of highlighting 110 a video rendering 151B of the second user 10B while the first user speaker 10A is providing the vocal input that is communicated to the attendees of the communication session, moving or positioning the video rendering 151B of the second user 10B to a predetermined region, e.g., main stage 120A of the user interface arrangement 101B while the first user speaker 10A is providing the vocal input that is communicated to the attendees of the communication session, or associating an identity of the second user 10B to transcript text 140 or close captioning text 130 generated from the vocal input from the first user speaker 10A.

Figure 4A:
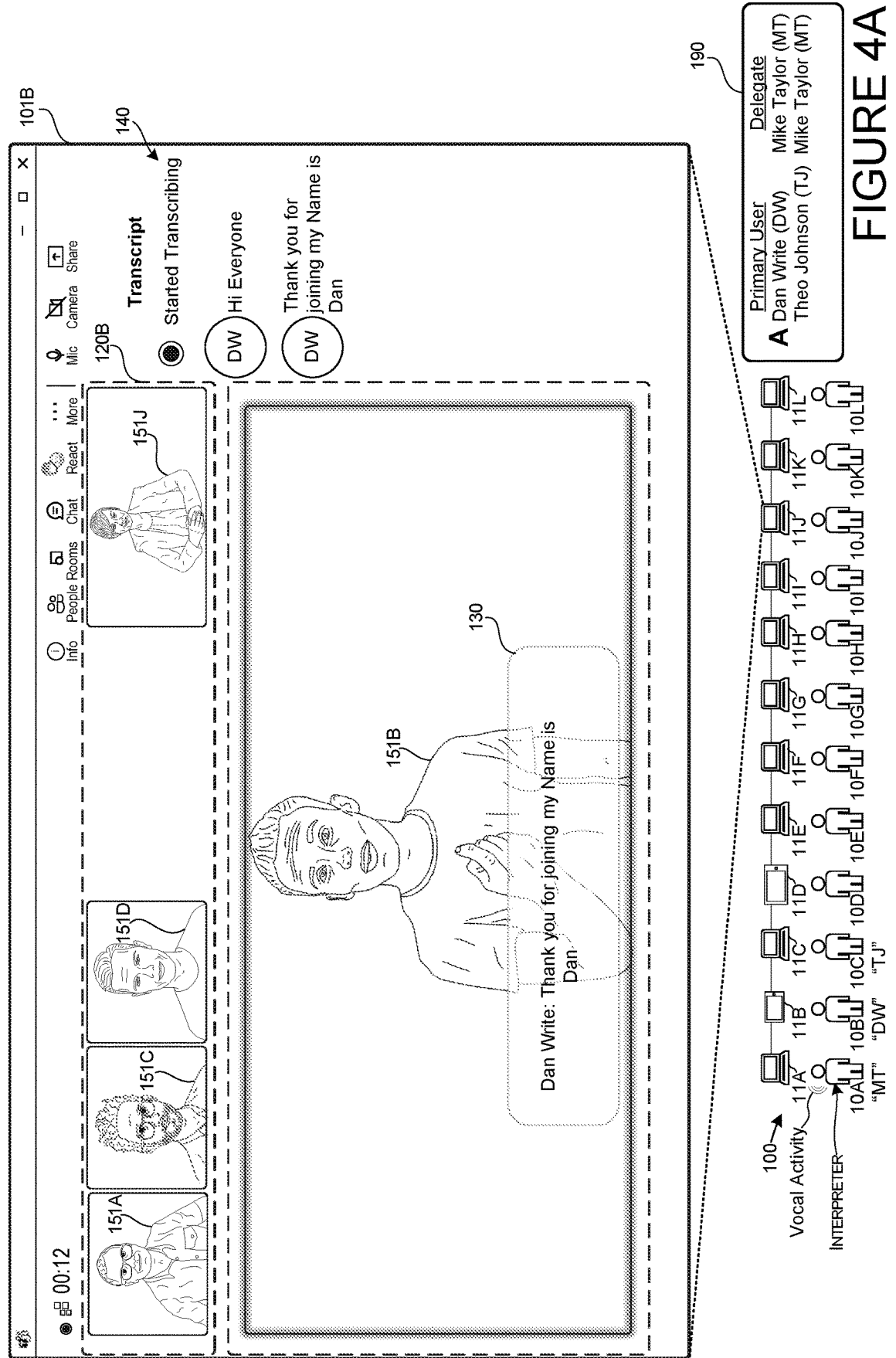
FIG. 4A illustrates a first phase of a process where an assistant is assigned as a delegate to multiple presenters, where a computer displays a first user interface arrangement that gives attribution a first presenter while the assistant is providing a voice input on behalf of the first presenter.
Figure 4B:
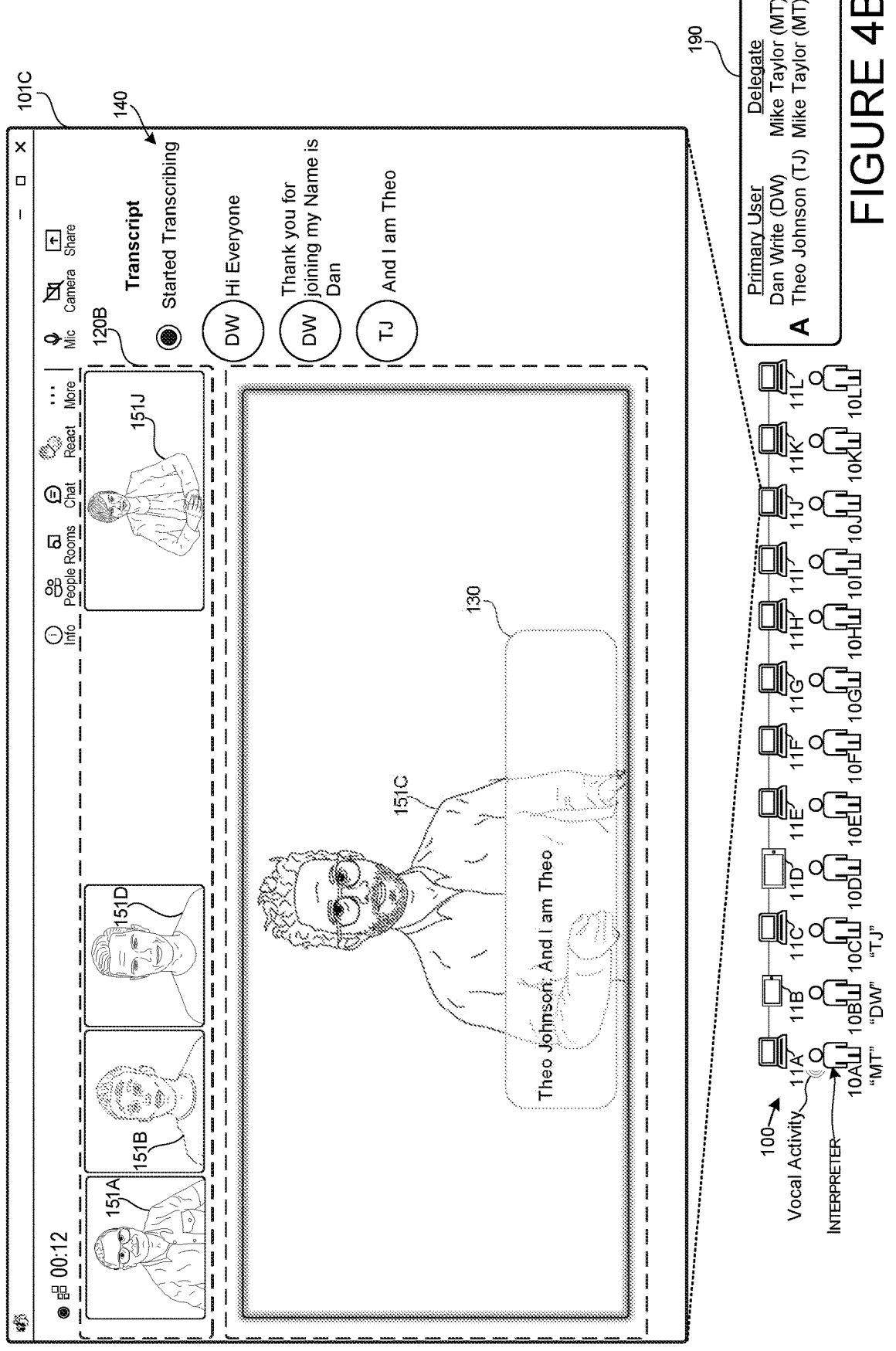
FIG. 4B illustrates a second phase of a process where an assistant is assigned as a delegate to multiple presenters, where a computer displays a second user interface arrangement that gives attribution a second presenter while the assistant is providing a voice input on behalf of the second presenter.

Referring now to FIGS. 4A-4B, an example scenario showing how a system can dynamically switch between multiple presenters that use the same delegated assistant. The system can accommodate this scenario by selecting individual presenters who are to receive credit for a vocal input provided by an assistant. This selection can be made in response to a user input or the selection can be performed automatically. For example, an assistant representing two different meeting presenters can provide an input to select each presenter as each presenter is contributing to a meeting. In another example, a system can detect predetermined gestures performed by each presenter and give attribution to an individual presenter in response to the detection of predetermined gestures performed by the individual presenter. An example of a detected predetermined gesture can include the detection of a D/HH attendee using sign language. When the system determines that a particular attendee is using sign language, the system can give attribution to that user for a speech input that is provide by a designated assistant.

FIG. 4A illustrates a first phase of an example process where an assistant, the first user 10A, is assigned as a delegate to multiple presenters, the second user 10B and the third user 10C. In this first mode of operation, a computer displays a user interface arrangement 101B that gives attribution a first presenter while the assistant is providing a voice input on behalf of the first presenter. Attribution can be given to the first presenter in response to a determination that the first user is designated as a delegate to the second user, e.g., the first presenter, and in response to a detection that the first user is speaking, and in response to a detection that the second user is performing a predetermined gesture, e.g., signing or performing any other action that provides information that is interpreted by the first user. As shown, a rendering 151B of the first presenter, the second user 10B, is shown in the main stage, and a highlight is given to that video rendering. An identity of the second user 10B is also associate with transcript text 140 and close captioning text 130 generated from the vocal input from the first user 10A, the active speaker.

FIG. 4B illustrates a second phase of the example process where the assistant, the first user 10A, is assigned as a delegate to multiple presenters, the second user 10B and the third user 10C. In this second mode of operation, a computer displays another user interface arrangement 101C that gives attribution a second presenter, the third user 10C, while the assistant is providing a voice input on behalf of the second presenter. Attribution can be given to the second presenter in response to a determination that the first user is designated as a delegate to the third user, e.g., the second presenter, and in response to a detection that the first user is actively speaking, and in response to a detection that the third user is performing a predetermined gesture, e.g., signing or performing any other action that provides information that is interpreted by the first user. As shown, a rendering 151C of the second presenter, the third user 10C, is shown in the main stage, and a highlight is given to that video rendering. An identity of the third user 10C is also associate with transcript text 140 and close captioning text 130 generated from the vocal input from the first user 10A, e.g., the active speaker.

Figure 5:
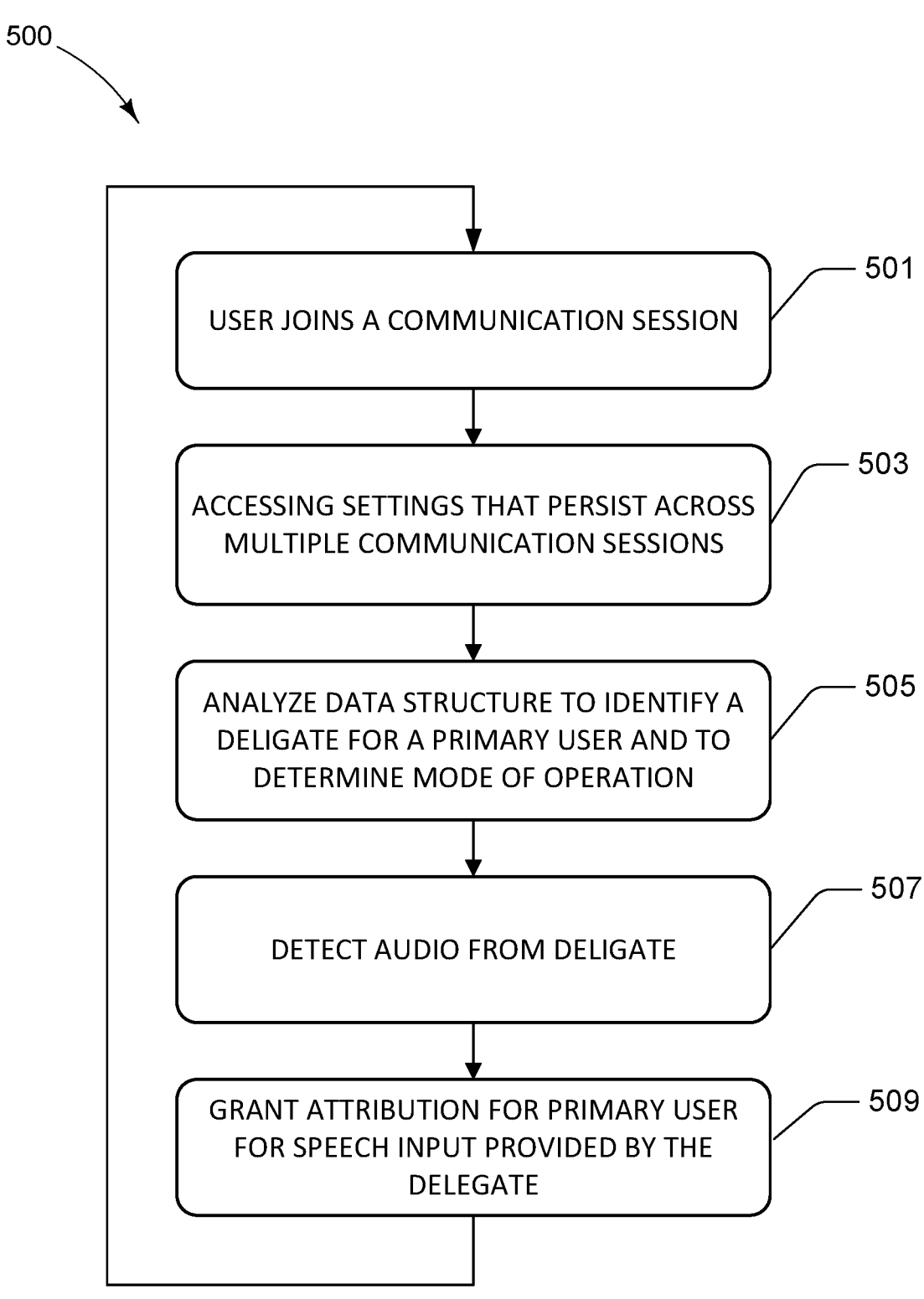
FIG. 5 is a flow diagram showing aspects of a routine capable of implementing aspects of the techniques and technologies presented herein.

Turning now to FIG. 5, aspects of a routine 500 for the disclosed techniques. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media and computer-readable media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine are described herein as being implemented, at least in part, by an application, component and/or circuit, such as a device module that can be included in any one of the memory components disclosed herein, including but not limited to RAM. In some configurations, the device module can be a dynamically linked library (DLL), a statically linked library, functionality enabled by an application programing interface (API), a compiled program, an interpreted program, a script or any other executable set of instructions. Data, such as input data or a signal from a sensor, received by the device module can be stored in a data structure in one or more memory components. The data can be retrieved from the data structure by addressing links or references to the data structure.

Although the following illustration refers to the components depicted in the present application, it can be appreciated that the operations of the routine may be also implemented in many other ways. For example, the routine may be implemented, at least in part, by a processor of another remote computer or a local circuit. In addition, one or more of the operations of the routine may alternatively or additionally be implemented, at least in part, by a chipset working alone or in conjunction with other software modules. Any service, circuit or application suitable for providing input data indicating the position or state of any device may be used in operations described herein.

The routine 500 includes an operation 501 where the system detects that a user of a computer joins a communication session. The communication session can be in the form of an online meeting and a user, such as User J, can join using a communication application that is configure to display live video streams of multiple users.

At operation 503, the system accesses settings 400 that persist across multiple communication sessions for a user 10J. The settings define individual prerequisites 410 for the user 10J. The access to the settings is automatically performed by the system without user input. The use of the settings causes the system to determine permissions for each user. The selection is performed automatically by the system 100 in response to the user 10J joining a communication session.

At operation 505 the system analyzes a data structure, such as metadata 190, that is associations between primary attendees, e.g., people who have a role as being a presenter in a meeting, and assistants, e.g., people who are selected as interpreters, note takers, translators for the presenters. The designation of the roles can be made prior to a meeting or during a meeting. The designation can be made for particular meetings or for particular portions of specific meetings. Using metadata defining specific meetings or defining particular portions of specific meetings, a system can change the operating mode of a meeting and give attribution to specific attendees. The attribution for a particular speech input can be changed to different attendees even though the source of the speech input does not change to different attendees. This level of control allows both the primary attendee and the delegated assistant to receive attribution at times when they are substantively contributing to a meeting, but also allows the primary attendee to receive attribution at other times when the delegated assistant is speaking on behalf of the primary attendee. Metadata defining an assistant for another user is also referred to herein as a person who is tethered to a user.

When a user is tethered to another user, the system uses a tethering component that permits a user, such as a primary user, to tether one or more other users to the secondary stage. A tethered user receives notifications, including meeting invitations whenever the primary user receives the meeting invitations. In other words, the tethered user is automatically copied or included in all meeting invitations issued to the primary user. A video feed of the tethered user can also optionally automatically be included within the secondary stage whenever the tethered user joins the video conferencing meeting.

In other examples, the tethering component enables active speaker attribution of the primary user whenever the tethered user interpreter speaks on behalf of the primary user during the video conferencing meeting. In this manner, the primary user receives appropriate acknowledgement and attribution when an interpreter verbally translates sign language of a deaf or HH primary user. In some examples, support provider(s) are tethered to the primary user. Support provider(s) include one or more support providers. A support provider can include an interpreter, an assistant, a note-taker, a live captioner, or any other type of support provider.

At operation 507, the system can detect audio from a delegate. For instance, a system can monitor an audio channel of a person who is designated as an assistant and determine if that person has provided a threshold level of volume or a threshold number of words. If one of those conditions has been met with respect to the audio channel, the system determines if a person is assigned as an assistant to another user.

In operation 509, in response to determining that the metadata including a designation identifying the first user speaker being a delegate for the second user 10B, the routine invokes the second operating mode by providing attribution to the second user for the vocal input received from the first user speaker 10A in video streams of the video conference session delivered to the devices, wherein the attribution includes as least one of highlighting 110 a video rendering 151B of the second user 10B while the first user speaker 10A is providing the vocal input that is communicated to the attendees of the communication session, moving or positioning the video rendering 151B of the second user 10B to a predetermined region (e.g., main stage) 120A of the user interface arrangement while the first user speaker 10A is providing the vocal input that is communicated to the attendees of the communication session, or associating an identity of the second user 10B to text of a transcript or close captioning text generated from the vocal input from the first user speaker 10A.

The above-described routine can manage display of videos of attendees in a video conference session, the method executed on a system 100 operating in two modes: a first operating mode for providing attribution to a first user speaker 10A and a second operating mode for providing attribution to a second user 10B associated with the first user speaker 10A. The routine includes detecting a vocal input from a first user speaker 10A, the vocal input being destined to deliver to devices of other attendees in the video conference session; in response to detecting the vocal input from the first user speaker 10A, accessing metadata 190 associated with the first user speaker 10A to determine an operating mode of the system 100, wherein the metadata specifies a delegation designation of the first user speaker; and as shown in FIG. 1A, A First Operating Mode Regular Mode highlights the active speaker when the active speaker the "first user speaker" is not assigned as a delegate to the primary user, thus, in response to determining that the metadata does not include a designation identifying the first user speaker being a delegate for another user, invoking the first operating mode by providing attribution to the first user speaker 10A for the vocal input received from the first user speaker 10A in video streams of the video conference session delivered to the devices, wherein the attribution includes as least one of highlighting 110 a video rendering 151A of the first user speaker 10A, moving or positioning the video rendering 151A of the first user 10A to a predetermined region, e.g., main stage 120A, of a user interface arrangement of the communication session, or associating an identity of the first user speaker 10A with close captioning text 130 or transcript text 140 generated from the vocal input from the first user speaker 10A; and as shown in FIG. 1B, a Second Operating Mode Delegate Mode highlights the primary user "second user" when the first user is designated as a delegate to the primary user, thus in response to determining that the metadata including a designation identifying the first user speaker being a delegate for the second user 10B, invoking the second operating mode by providing attribution to the second user 10B for the vocal input received from the first user speaker 10A in video streams of the video conference session delivered to the devices, wherein the attribution includes as least one of highlighting 110 a video rendering 151B of the second user 10B while the first user speaker 10A is providing the vocal input that is communicated to the attendees of the communication session, moving or positioning the video rendering 151B of the second user 10B to a predetermined region e.g., main stage 120A of the user interface arrangement while the first user speaker 10A is providing the vocal input that is communicated to the attendees of the communication session, or associating an identity of the second user 10B to text of a transcript or close captioning text generated from the vocal input from the first user speaker 10A.

In the routine, as shown in FIG. 2, an embodiment where the metadata defines tethering for specific times and specific meetings, the metadata indicates that the first user speaker is an active designated assistant for the second user, wherein the designation is active for predetermined times of one or more specific communication sessions, the designation is not active for times other than the predetermined times, wherein the second operating mode is invoked automatically when the designation is active for the predetermined times, wherein the second operating mode is not invoked automatically when the designation is not active.

In the routine, an embodiment where presenter can provide an input during the meeting to select an assistant, also includes receiving an input from the second user, the input indicating an activation of the designation, wherein the designation identifies the first user speaker being the delegate for the second user, wherein the designation is not active prior to the input from the second user, wherein the second operating mode is invoked automatically when the designation is active, wherein the second operating mode is not invoked automatically when the designation is not active.

In the routine, as shown in FIGS. 3A-3C, an embodiment where a user input can cause the system to revert back to a regular mode to give attribution to the active speaker, e.g., a moderator, the primary attendee, or the assistant provides an input. The routine also includes receiving an input from the second user, the input indicating an activation of the designation, wherein the designation identifies the first user speaker being the delegate for the second user, wherein the designation is not active prior to the input from the second user, wherein the second operating mode is invoked automatically when the designation is active, wherein the second operating mode is not invoked automatically when the designation is not active.

In the routine, as shown in FIGS. 3A-3C, the active speaker can receive attribution by a voice input, e.g., "I have an announcement" The routine also includes monitoring the vocal input to detect an indication of a mode change; and in response to detecting the indication of a mode change, transitioning from the second operating mode to the first operating mode to provide attribution to the first user.

In the routine, as shown in FIG. 4A-4B, in manual mode: two primary attendees are using the same assistant, manual mode controls who gets attribution, e.g., the assistant provides an input to select a second presenter third user 10C. The routine also includes receiving an input from the first user speaker indicating a selection of a third user 10C; and in response to the input indicating the selection of third user, invoking the second operating mode by providing attribution to the third user 10C for the vocal input received from the first user speaker 10A in video streams of the video conference session delivered to the devices, wherein the attribution includes as least one of highlighting 110 a video rendering 151B of the third user 10C while the first user speaker 10A is providing the vocal input that is communicated to the attendees of the communication session, moving or positioning the video rendering 151B of the third user 10C to a predetermined region 120A of the user interface arrangement while the first user speaker 10A is providing the vocal input that is communicated to the attendees of the communication session, or associating an identity of the third user 10C to text of a transcript or close captioning text generated from the vocal input from the first user speaker 10A.

In the routine, as shown in FIG. 4A-4B, in automatic mode: two primary attendees are using the same assistant, system detects hand signing of the second presenter. The routine also includes monitoring a video feed provided by a third user 10C to detect a predetermined gesture; and in response to detecting that the video feed provided by the third user 10C indicates the predetermined gesture, invoking the second operating mode by providing attribution to the third user 10C for the vocal input received from the first user speaker 10A in video streams of the video conference session delivered to the devices, wherein the attribution includes as least one of highlighting 110 a video rendering 151B of the third user 10C while the first user speaker 10A is providing the vocal input that is communicated to the attendees of the communication session, moving or positioning the video rendering 151B of the third user 10C to a predetermined region 120A of the user interface arrangement while the first user speaker 10A is providing the vocal input that is communicated to the attendees of the communication session, or associating an identity of the third user 10C to text of a transcript or close captioning text generated from the vocal input from the first user speaker 10A.

Figure 6:
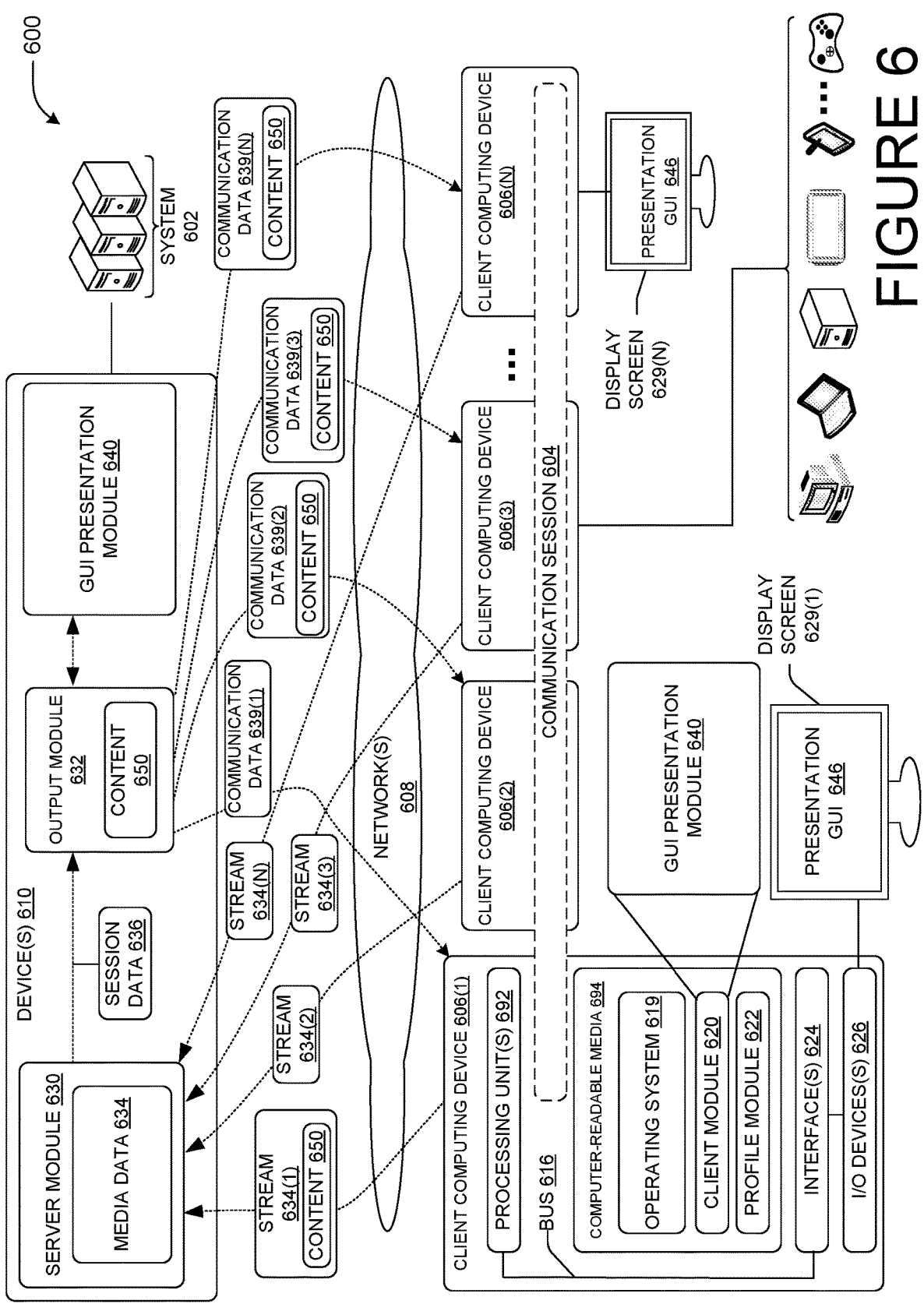
FIG. 6 is a diagram illustrating a distributed computing environment capable of implementing aspects of the techniques and technologies presented herein.

FIG. 6 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 6 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(N)), which can display a UI according to the techniques described herein.

In the example environment 600 of FIG. 6, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 6) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 6, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 7:
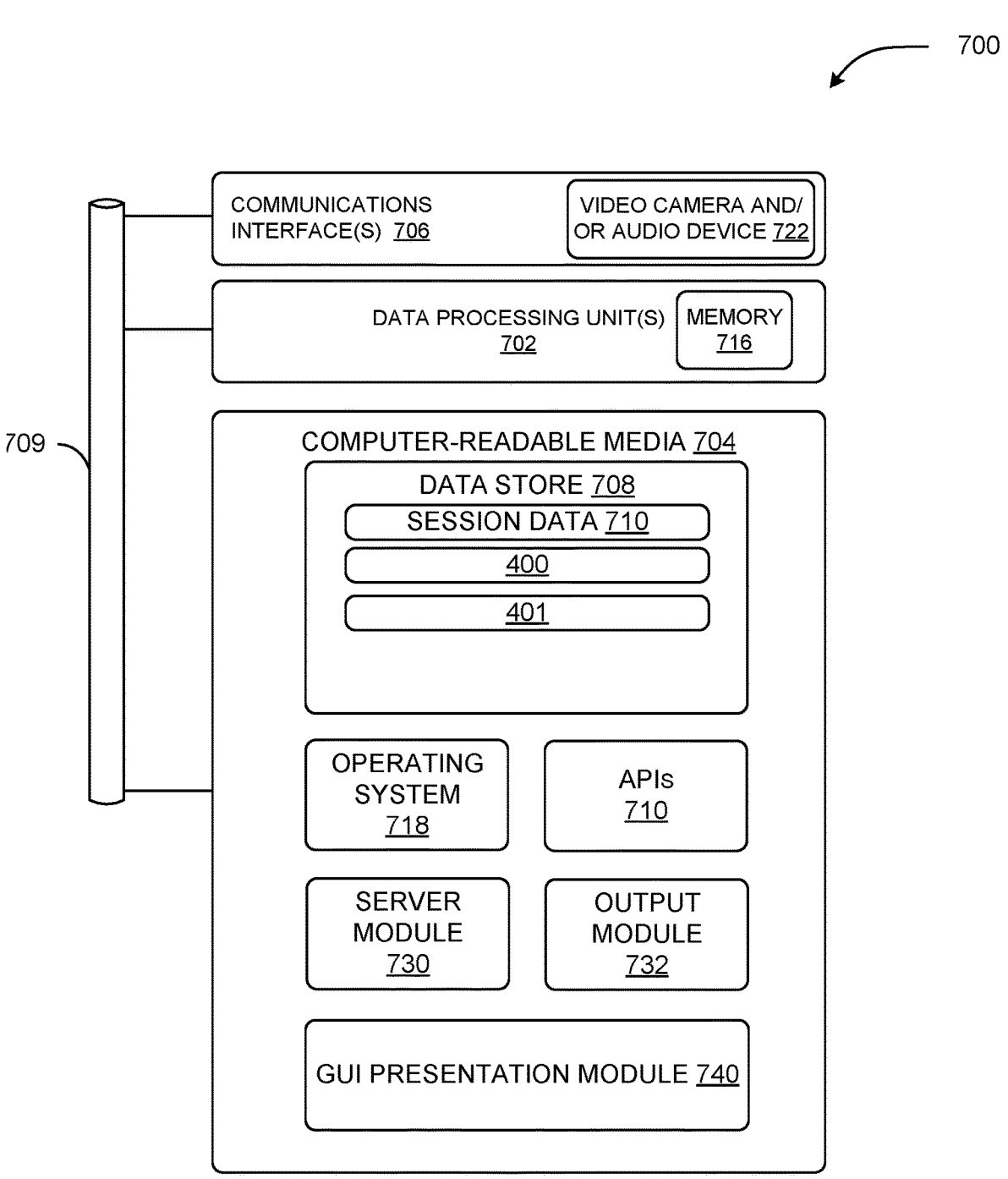
FIG. 7 is a computer architecture diagram illustrating a computing device architecture for a computing device capable of implementing aspects of the techniques and technologies presented herein.

FIG. 7 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("AS-SPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, computer-readable storage medium, computer-readable storage device, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 6), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This contextual information can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described.

Rather, the specific features and acts are disclosed as example forms of implementing the claimed subject matter.

We claim:

1. A method for managing display of videos of attendees in a video conference session, the method executed on a system operating in two modes: a first operating mode for providing attribution to a first user speaker and a second operating mode for providing attribution to a second user associated with the first user speaker, the method comprising:

detecting a vocal input from a first user speaker that meets a volume threshold or an audio threshold, the vocal input being destined to deliver to devices of other attendees in the video conference session;

in response to detecting the vocal input from the first user speaker meeting the volume threshold or the audio threshold, accessing metadata associated with the first user speaker to determine an operating mode of the system, wherein the metadata specifies a delegation designation of the first user speaker;

in response to determining that the metadata does not include a designation identifying the first user speaker being a delegate for another user, automatically invoking the first operating mode by providing attribution to the first user speaker for the vocal input received from the first user speaker in video streams of the video conference session delivered to the devices and automatically updating the metadata to indicate an inactive designation between the delegate and the first user speaker, wherein the attribution includes as least one of highlighting a video rendering of the first user speaker, moving or positioning the video rendering of the first user to a predetermined region of a user interface arrangement of the communication session, or associating an identity of the first user speaker with close captioning text or transcript text generated from the vocal input from the first user speaker; and in response to determining that the metadata including a designation identifying the first user speaker being a delegate for the second user, automatically invoking the second operating mode by providing attribution to the second user for the vocal input received from the first user speaker in video streams of the video conference session delivered to the devices, and automatically updating the metadata to indicate an active designation between the delegate and the first user speaker, wherein the attribution includes as least one of highlighting a video rendering of the second user while the first user speaker is providing the vocal input that is communicated to the attendees of the communication session, moving or positioning the video rendering of the second user to a prede-termined region of the user interface arrangement while the first user speaker is providing the vocal input that is communicated to the attendees of the communication session, or associating an identity of the second user to text of a transcript or close captioning text generated from the vocal input from the first user speaker.

2. The method of claim 1, wherein the metadata indicates that the first user speaker is an active designated assistant for the second user, wherein the designation is active for pre-determined times of one or more specific communication sessions, the designation is not active for times other than the predetermined times, wherein the second operating mode is invoked automatically when the designation is active for the predetermined times, wherein the second operating mode is not invoked automatically when the designation is not active.

3. The method of claim 1, further comprising: receiving an input from the second user, the input indicating an activation of the designation, wherein the designation iden-tifies the first user speaker being the delegate for the second user, wherein the designation is not active prior to the input from the second user, wherein the second operating mode is invoked automatically when the designation is active, wherein the second operating mode is not invoked automati-cally when the designation is not active.

4. The method of claim 1, further comprising: receiving an input from the second user, the input indicating an activation of the designation, wherein the designation iden-tifies the first user speaker being the delegate for the second user, wherein the designation is not active prior to the input from the second user, wherein the second operating mode is invoked automatically when the designation is active, wherein the second operating mode is not invoked automati-cally when the designation is not active.

5. The method of claim 1, further comprising:
monitoring the vocal input to detect an indication of a mode change; and
in response to detecting the indication of a mode change, transitioning from the second operating mode to the first operating mode to provide attribution to the first user.

6. The method of claim 1, further comprising:
receiving an input from the first user speaker indicating a selection of a third user; and
in response to the input indicating the selection of third user, invoking the second operating mode by providing attribution to the third user for the vocal input received from the first user speaker in video streams of the video conference session delivered to the devices, wherein the attribution includes as least one of highlighting a video rendering of the third user while the first user speaker is providing the vocal input that is communi-cated to the attendees of the communication session, moving or positioning the video rendering of the third user to a predetermined region of the user interface arrangement while the first user speaker is providing the vocal input that is communicated to the attendees of the communication session, or associating an identity of the third user to text of a transcript or close caption-ing text generated from the vocal input from the first user speaker.

7. The method of claim 1, further comprising:
monitoring a video feed provided by a third user to detect a predetermined gesture; and
in response to detecting that the video feed provided by the third user indicates the predetermined gesture, invoking the second operating mode by providing attribution to the third user for the vocal input received from the first user speaker in video streams of the video conference session delivered to the devices, wherein the attribution includes as least one of highlighting a video rendering of the third user while the first user speaker is providing the vocal input that is communi-cated to the attendees of the communication session, moving or positioning the video rendering of the third user to a predetermined region of the user interface arrangement while the first user speaker is providing the vocal input that is communicated to the attendees of the communication session, or associating an identity of the third user to text of a transcript or close captioning text generated from the vocal input from the first user speaker.

8. A computing device for managing display of videos of attendees in a video conference session, the computing device configured to operate in two modes: a first operating mode for providing attribution to a first user speaker and a second operating mode for providing attribution to a second user associated with the first user speaker, the computing device comprising:

one or more processing units; and a computer-readable storage medium having encoded thereon computer-executable instructions to cause the one or more processing units to:

detect a vocal input from a first user speaker that meets a volume threshold or an audio threshold, the vocal input being destined to deliver to devices of other attendees in the video conference session;

in response to detecting the vocal input from the first user speaker meeting the volume threshold or the audio threshold, access metadata associated with the first user speaker to determine an operating mode of the system, wherein the metadata specifies a delegation designation of the first user speaker;

in response to determining that the metadata does not include a designation identifying the first user speaker being a delegate for another user, automatically invoke the first operating mode by providing attribution to the first user speaker for the vocal input received from the first user speaker in video streams of the video conference session delivered to the devices and automatically update the metadata to indicate an inactive designation between the delegate and the first user speaker, wherein the attribution includes as least one of highlighting a video rendering of the first user speaker, moving or positioning the video rendering of the first user to a predetermined region of a user interface arrangement of the communication session, or associating an identity of the first user speaker with close captioning text or transcript text generated from the vocal input from the first user speaker; and in response to determining that the metadata including a designation identifying the first user speaker being a delegate for the second user, automatically invoke the second operating mode by providing attribution to the second user for the vocal input received from the first user speaker in video streams of the video conference session delivered to the devices and automatically update the metadata to indicate an active designation between the delegate and the first user speaker, wherein the attribution includes as least one of highlighting a video rendering of the second user while the first user speaker is providing the vocal input that is communicated to the attendees of the communication session, moving or positioning the video rendering of the second user to a predetermined region of the user interface arrangement while the first user speaker is providing the vocal input that is communicated to the attendees of the communication session, or associating an identity of the second user to text of a transcript or close captioning text generated from the vocal input from the first user speaker.

9. The computing device of claim 8, wherein the metadata indicates that the first user speaker is an active designated assistant for the second user, wherein the designation is active for predetermined times of one or more specific communication sessions, the designation is not active for times other than the predetermined times, wherein the second operating mode is invoked automatically when the designation is active for the predetermined times, wherein the second operating mode is not invoked automatically when the designation is not active.

10. The computing device of claim 8, wherein the instructions further cause the one or more processing units to: receive an input from the second user, the input indicating an activation of the designation, wherein the designation identifies the first user speaker being the delegate for the second user, wherein the designation is not active prior to the input from the second user, wherein the second operating mode is invoked automatically when the designation is active, wherein the second operating mode is not invoked automatically when the designation is not active.

11. The computing device of claim 8, wherein the instructions further cause the one or more processing units to: receive an input from the second user, the input indicating an activation of the designation, wherein the designation identifies the first user speaker being the delegate for the second user, wherein the designation is not active prior to the input from the second user, wherein the second operating mode is invoked automatically when the designation is active, wherein the second operating mode is not invoked automatically when the designation is not active.

12. The computing device of claim 8, wherein the instructions further cause the one or more processing units to:

monitor the vocal input to detect an indication of a mode change; and in response to detecting the indication of a mode change, transition from the second operating mode to the first operating mode to provide attribution to the first user.

13. The computing device of claim 8, wherein the instructions further cause the one or more processing units to:

receive an input from the first user speaker indicating a selection of a third user; and in response to the input indicating the selection of third user, invoking the second operating mode by providing attribution to the third user for the vocal input received from the first user speaker in video streams of the video conference session delivered to the devices, wherein the attribution includes as least one of highlighting a video rendering of the third user while the first user speaker is providing the vocal input that is communicated to the attendees of the communication session, moving or positioning the video rendering of the third user to a predetermined region of the user interface arrangement while the first user speaker is providing the vocal input that is communicated to the attendees of the communication session, or associating an identity of the third user to text of a transcript or close captioning text generated from the vocal input from the first user speaker.

14. The computing device of claim 8, wherein the instructions further cause the one or more processing units to:

monitor a video feed provided by a third user to detect a predetermined gesture; and in response to detecting that the video feed provided by the third user indicates the predetermined gesture, invoke the second operating mode by providing attribution to the third user for the vocal input received from the first user speaker in video streams of the video conference session delivered to the devices, wherein the attribution includes as least one of highlighting a video rendering of the third user while the first user speaker is providing the vocal input that is communicated to the attendees of the communication session, moving or positioning the video rendering of the third user to a predetermined region of the user interface arrangement while the first user speaker is providing the vocal input that is communicated to the attendees of the communication session, or associating an identity of the third user to text of a transcript or close captioning text generated from the vocal input from the first user speaker.

15. A computer-readable storage medium for a system that manages a display of videos of attendees in a video conference session, the system configured to operate in two modes: a first operating mode for providing attribution to a first user speaker and a second operating mode for providing attribution to a second user associated with the first user speaker, the computer-readable storage medium having encoded thereon computer-executable instructions to cause one or more processing units of a system to:

detect a vocal input from a first user speaker that meets a volume threshold or an audio threshold, the vocal input being destined to deliver to devices of other attendees in the video conference session;

in response to detecting the vocal input from the first user speaker meeting the volume threshold or the audio threshold, access metadata associated with the first user speaker to determine an operating mode of the system, wherein the metadata specifies a delegation designation of the first user speaker;

in response to determining that the metadata does not include a designation identifying the first user speaker being a delegate for another user, automatically invoke the first operating mode by providing attribution to the first user speaker for the vocal input received from the first user speaker in video streams of the video conference session delivered to the devices and automatically updating the metadata to indicate an inactive designation between the delegate and the first user speaker, wherein the attribution includes as least one of highlighting a video rendering of the first user speaker, moving or positioning the video rendering of the first user to a predetermined region of a user interface arrangement of the communication session, or associating an identity of the first user speaker with close captioning text or transcript text generated from the vocal input from the first user speaker; and in response to determining that the metadata including a designation identifying the first user speaker being a delegate for the second user, automatically invoke the second operating mode by providing attribution to the second user for the vocal input received from the first user speaker in video streams of the video conference session delivered to the devices, and automatically update the metadata to indicate an active designation between the delegate and the first user speaker, wherein the attribution includes as least one of highlighting a video rendering of the second user while the first user speaker is providing the vocal input that is communicated to the attendees of the communication session, moving or positioning the video rendering of the second user to a predetermined region of the user interface arrangement while the first user speaker is providing the vocal input that is communicated to the attendees of the communication session, or associating an identity of the second user to text of a transcript or close captioning text generated from the vocal input from the first user speaker.

16. The computer-readable storage medium of claim 15, wherein the metadata indicates that the first user speaker is an active designated assistant for the second user, wherein the designation is active for predetermined times of one or more specific communication sessions, the designation is not active for times other than the predetermined times, wherein the second operating mode is invoked automatically when the designation is active for the predetermined times, wherein the second operating mode is not invoked automatically when the designation is not active.

17. The computer-readable storage medium of claim 15, wherein the instructions further cause the one or more processing units to: receive an input from the second user, the input indicating an activation of the designation, wherein the designation identifies the first user speaker being the delegate for the second user, wherein the designation is not active prior to the input from the second user, wherein the second operating mode is invoked automatically when the designation is active, wherein the second operating mode is not invoked automatically when the designation is not active.

18. The computer-readable storage medium of claim 15, wherein the instructions further cause the one or more processing units to: receive an input from the second user, the input indicating an activation of the designation, wherein the designation identifies the first user speaker being the delegate for the second user, wherein the designation is not active prior to the input from the second user, wherein the second operating mode is invoked automatically when the designation is active, wherein the second operating mode is not invoked automatically when the designation is not active.

19. The computer-readable storage medium of claim 15, wherein the instructions further cause the one or more processing units to:

monitor the vocal input to detect an indication of a mode change; and in response to detecting the indication of a mode change, transition from the second operating mode to the first operating mode to provide attribution to the first user.

20. The computer-readable storage medium of claim 15, wherein the instructions further cause the one or more processing units to:

receive an input from the first user speaker indicating a selection of a third user; and in response to the input indicating the selection of third user, invoking the second operating mode by providing attribution to the third user for the vocal input received from the first user speaker in video streams of the video conference session delivered to the devices, wherein the attribution includes as least one of highlighting a video rendering of the third user while the first user speaker is providing the vocal input that is communicated to the attendees of the communication session, moving or positioning the video rendering of the third user to a predetermined region of the user interface arrangement while the first user speaker is providing the vocal input that is communicated to the attendees of the communication session, or associating an identity of the third user to text of a transcript or close captioning text generated from the vocal input from the first user speaker.

* * * * *